United States Patent
Beheshti et al.

(10) Patent No.: US 12,441,239 B1
(45) Date of Patent: Oct. 14, 2025

(54) AUTONOMOUS VEHICLE SOUND DETERMINATION BY A MODEL

(71) Applicant: Zoox, Inc., Foster City, CA (US)

(72) Inventors: Seyed Parsa Beheshti, Belmont, CA (US); William Randolph Geddings, Jr., San Francisco, CA (US); Anoop Jatavallabha Vijayakumar, Fremont, CA (US); Shaminda Subasingha, San Ramon, CA (US)

(73) Assignee: Zoox, Inc., Foster City, CA (US)

( * ) Notice: Subject to any disclaimer, the term of this patent is extended or adjusted under 35 U.S.C. 154(b) by 106 days.

(21) Appl. No.: 18/428,924

(22) Filed: Jan. 31, 2024

(51) Int. Cl.
*B60Q 5/00* (2006.01)
*G10K 11/18* (2006.01)

(52) U.S. Cl.
CPC ............ *B60Q 5/006* (2013.01); *B60Q 5/008* (2013.01); *G10K 11/18* (2013.01)

(58) Field of Classification Search
CPC ......... B60Q 5/006; B60Q 5/008; G10K 11/18
USPC ........................................................ 340/463
See application file for complete search history.

(56) References Cited

U.S. PATENT DOCUMENTS

| | | | |
|---|---|---|---|
| 8,031,085 B1 * | 10/2011 | Anderson | B60Q 5/008 340/901 |
| 9,878,664 B2 | 1/2018 | Kentley-Klay et al. | |
| 9,981,602 B2 * | 5/2018 | Vincent | H04R 1/323 |
| 10,261,514 B2 * | 4/2019 | Zych | B60W 30/08 |
| 10,414,336 B1 * | 9/2019 | Harper | B60Q 5/008 |
| 10,497,264 B2 * | 12/2019 | Rowell | G06T 7/248 |
| 10,547,941 B1 * | 1/2020 | Herman | B60Q 5/005 |
| 11,016,492 B2 | 5/2021 | Gier et al. | |
| 11,027,648 B2 * | 6/2021 | Harper | G10K 13/00 |
| 11,458,891 B1 * | 10/2022 | Kuehner | H04R 1/323 |
| 11,488,472 B2 * | 11/2022 | Parenti | B60W 60/001 |
| 11,500,378 B2 * | 11/2022 | Kentley-Klay | G08G 1/056 |
| 2016/0362045 A1 * | 12/2016 | Vegt | H04L 67/12 |
| 2017/0222612 A1 * | 8/2017 | Zollner | H04R 3/12 |
| 2018/0290590 A1 * | 10/2018 | Goldman-Shenhar | B60Q 9/008 |
| 2019/0329794 A1 * | 10/2019 | Kim | B60K 35/28 |
| 2020/0156538 A1 * | 5/2020 | Harper | G10K 11/34 |
| 2021/0245742 A1 * | 8/2021 | Ha | H04W 4/90 |
| 2022/0185267 A1 | 6/2022 | Beller et al. | |

* cited by examiner

*Primary Examiner* — Eric Blount
(74) *Attorney, Agent, or Firm* — Lee & Hayes, P.C.

(57) ABSTRACT

Techniques for determining audio data for output by an autonomous vehicle are discussed herein. A system can determine audio data representing a frequency and a sound level for different object types in an environment. The audio data can be specific for a human or animal, and can be adjusted based on a noise level in the environment, weather, ambient light, or other criteria. A model may determine audio data for continuous output in a vicinity of a specific object or region in the environment. A sound level of the audio data may be adjusted over time base on a likelihood an intersection between a vehicle path and an object path.

20 Claims, 5 Drawing Sheets

AUTONOMOUS VEHICLE SOUND DETERMINATION BY A MODEL

BACKGROUND

An electric vehicle may be required to produce a level of sound under certain operating conditions to compensate for the lack of noise from a combustion engine. Sound produced by the electric vehicle may notify a person or object of the presence of the electric vehicle. However, the level of sound produced by the vehicle can contribute to noise pollution and may unnecessarily disrupt not just the person, but other people or animals in the environment. When multiple electric vehicles occupy a relatively small space, sound output by each vehicle can lead to excessively noisy situations and potential confusion by a human or animal. In the context of an autonomous vehicle, it may be important for the autonomous vehicle to have a scheme to proactively output sounds that promote safety while minimizing noise in the environment, especially in complex environments in which a human and various animals can react differently to the sounds.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
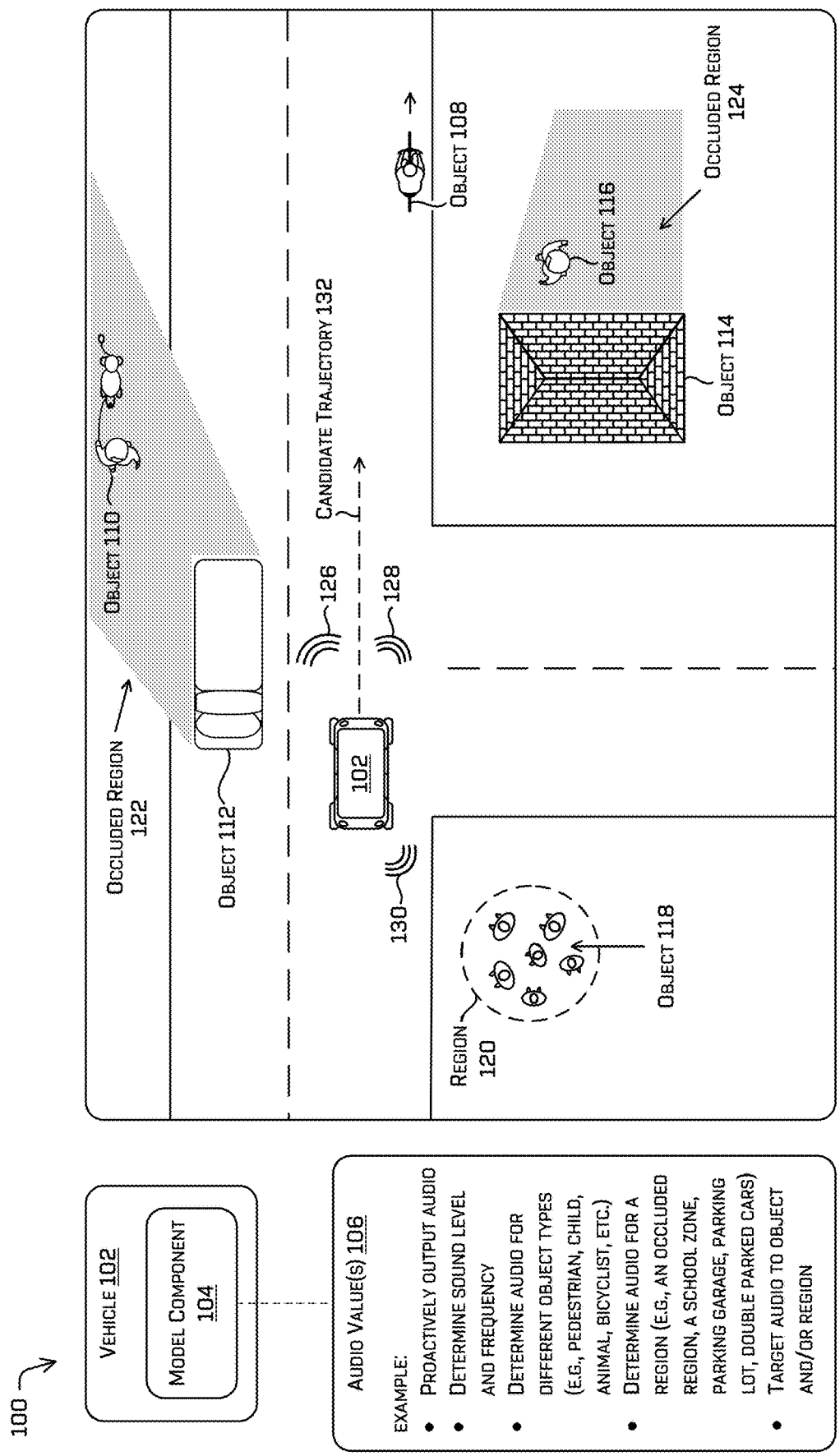
FIG. 1 is an illustration of an example environment, in which an example vehicle applies a model to determine one or more audio values.

This disclosure is directed to techniques for determining audio data for output by a vehicle. Such audio data can be determined by a model, such as a machine learned model, and can represent a frequency and sound level specific for an environment of the vehicle. In some examples, the model can determine audio data for output over a time period, and determine specific audio data for different objects and/or regions in the environment. For example, the model can determine first audio for a human, second audio for an occluded region, third audio for a school zone, caution zone, etc. Using the techniques described herein, a vehicle may receive audio data from a model to preemptively output sound as the vehicle navigates in an environment, thereby improving safety of the vehicle.

An autonomous vehicle can, in various examples, determine audio data for presenting to different types of dynamic objects such as a pedestrian, another vehicle, an animal, etc. The audio data may be determined for a sub-type of an object such as a sub-type of humans (e.g., child, person with a disability, human with headphones, etc.) and/or a sub-type of an animal (e.g., animal type, animal movement capabilities, animal behavior, domesticated vs. wild animal, etc.).

In some examples, the autonomous vehicle can determine audio data for presenting to a region in the environment based on the unique characteristics of the region. An example region can include a playground, a school, an underground or covered parking lot, an occluded region, a construction area, an area occupied by emergency personnel, a bicycle lane, a crosswalk, etc. Different frequency and/or sound level information can be output for various regions to optimize a response by a dynamic object in such regions.

To operate in an environment, an autonomous vehicle may be required to meet minimum sound requirements set by a government or other agency. The techniques described herein can include a vehicle computing device implementing one or more models to determine audio data that meets such requirements. Further, the model(s) can determine audio for output at various speeds and in various ambient conditions that promotes safety of the autonomous vehicle (e.g., including at speeds above those required by the government or agency).

In some examples, in order to avoid noise pollution, the vehicle may refrain from emitting sound if there are no objects or occluded regions present in the environment and/or if a likelihood of intersection between the vehicle and an object is below a certain threshold.

In some examples, a vehicle (such as an autonomous vehicle) may include audio sensors that collect audio information emitted from other vehicles, humans, animals, audio speakers, nature, etc. in an environment. The vehicle computing device can determine audio intensity and/or frequency spectrum information of the environment over a period of time based at least in part on the collected audio information. In various examples, the model(s) can determine audio data representing a second frequency spectrum for output by the autonomous vehicle that optimizes an audial presence of the autonomous vehicle. By determining a "noise level" of the environment, a machine learned model can determine the second frequency spectrum with consideration to a maximum noise level and current frequencies emitted in the environment.

In some examples, the vehicle can include one or more speaker arrays that are configured to emit sound in a three hundred sixty degree field of view relative to the vehicle. In various examples, the audio data generated by the model can be output by a speaker array in a direction of a specific object to avoid transmitting the audio data throughout the environment and potentially disturbing other objects. That is, two or more speakers can be used to direct the audio as a beam towards a specific object. By way of example and not limitation, an autonomous vehicle can detect a dog, determine presence of a leash, and determine first audio for a dog without a leash and second audio for a dog on a leash. In this way, a dog in the road can receive a different frequency and sound level than a dog on a leash to alert the dog in the road to the presence of the vehicle while minimizing or eliminating an effect on the dog on the leash.

The techniques described herein can be used to audibly notify pedestrians and other objects of the presence of an autonomous vehicle and/or other information about the autonomous vehicle in a variety of scenarios. For example, a model implemented by a vehicle computing device can determine a sound profile from a storage device (e.g., a catalog) of available sound profiles for a parking garage, parking lot, school zone, construction zone, retirement community, an area associated with an emergency response, and so on. To determine a sound profile, the model can receive input data such as one or more of: sensor data from one or more sensors associated with the autonomous vehicle (e.g., audio data from a microphone), log data associated with a previous time, map data, or weather data, just to name a few. In some examples, map data can indicate presence of a school zone a threshold distance from the autonomous vehicle, and the model can determine a sound profile comprising frequency information and sound level information configured to attract the attention of children in the school zone.

Portions of the environment may be obscured or otherwise occluded by an object or obstacle and may be referred to as occluded regions. Because of the lack of sensor data associated with an occluded region, it may be difficult to determine whether the occluded region is free of any objects or whether the occluded region is occupied by a static obstacle or a dynamic object such as a vehicle or pedestrian. Using the techniques as described wherein, a vehicle computing device can employ a model to identify occluded regions likely to be associated with an object that can intersect with a trajectory of the vehicle at a later time. In various examples, a same or different model can determine a sound profile for output by the autonomous vehicle in a direction of the occluded region based on sensor data, log data, map data, etc. indicating presence of the occluded region.

The system can employ a variety of different models to perform the techniques described herein. As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein can improve a functioning of a computing device of a vehicle in a number of ways. For example, the model may function as an attention system (e.g., as a redundant system to an existing perception component) that determines sounds for output by a speaker and/or further processing by a vehicle computing device. Proactively and continuously outputting sound determined by the vehicle computing device, for instance, can improve safety for dynamic objects surrounding the vehicle. For instance, the sounds output by the model can cause a dynamic object to avoid the vehicle or notify the dynamic object of the presence of the vehicle so that is not surprised by the presence of the vehicle.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using audio data. Further, although discussed in the context of emergency vehicle(s) or sounds associated with such emergency vehicle(s), the techniques can be applicable to any type or category of sound and are not limited to specific examples discussed herein. Additionally, the techniques described herein can be used with real data (e.g., captured using sensor(s)), simulated data (e.g., generated by a simulator), or any combination of the two.

FIG. 1 is an illustration of an example environment 100, in which an example vehicle (vehicle 102) applies a model (model component 104) to determine one or more audio values (audio value(s) 106). For example, a vehicle computing device (e.g., vehicle computing device 404) of the vehicle 102 may implement the model component 104 to determine the audio value(s) 106 (a frequency, a sound level, a sound spectrum, a sound pattern, etc.) for output by the vehicle 102. While described as a separate system, in some examples, the techniques described herein may be implemented by other vehicle systems, components, and/or computing devices. For example, and as will be described in further detail with regard to FIG. 4, the audio techniques described herein may be implemented at least partially by or in association with a localization component 420, a perception component 422, and/or a planning component 424.

The model component 104 can represent functionality to proactively determine audio values for output over a time period by one or more speakers or speaker arrays of the vehicle 102. The audio values can represent a frequency range and a sound level to be output toward one or more objects and/or regions of the environment 100. In various examples, the model component 104 can receive input data (e.g., map data, sensor data, log data, weather data, etc.) usable for determining the audio value(s) 106 for presentation to various types of objects in the environment. For instance, the audio value(s) 106 can vary according to an object type of an object and/or a region of the environment 100. Log data associated with one or more vehicles may, for instance, indicate audio values determined and/or output at previous times relative to a dynamic object and/or occluded region, and the model component 104 can consider such previous audio values in determining output data at a later time.

In various examples, the vehicle computing device may be configured to receive sensor data representing audio of the environment 100, such as via a perception component (e.g., the perception component 422). In some examples, the vehicle computing device may detect, infer, estimate, or otherwise determine audio data representing sound in the environment 100. For instance, sound may be received by the vehicle 102 as audio signals. In some examples, the sensor(s) may include sensors coupled to the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, audio sensors, and the like. In some examples, the sensor(s) may include one or more remote sensors, such as, for example sensors mounted on another autonomous vehicle, and/or sensors mounted in the environment 100. In various examples, the vehicle 102 may be configured to transmit and/or receive data from other autonomous vehicles. The data may include sensor data, such as audio data associated with the environment 100.

In some examples, the vehicle computing device may be configured to detect an object in the environment 100, such as, by way of example and not limitation, an object 108 (e.g., a bicyclist), an object 110 (e.g., a pedestrian with a dog on leash), an object 112 (e.g., another vehicle), an object 114 (e.g., a building), an object 116 (e.g., a human), and an object 118 (e.g., a group of children). The vehicle computing device may also or instead detect a region in the environment 100 such as region 120 (e.g., a playground, a school, etc.), an occluded region 122, and an occluded region 124. As shown in FIG. 1, the object 110 in the occluded region 122 is obscured or otherwise occluded by the object 112 while the object 116 in the occluded region 124 is obscured by the building (object 114) (e.g., relative to a field of view of the vehicle 102). Objects can be in a variety of locations proximate to the vehicle 102 including behind the vehicle 102, in examples.

The audio value(s) 106 can represent one or more acoustic parameters such as frequency, sound level, etc. for a time or time period. In some examples, the audio value(s) can represent a sound pattern based on, for example, a sound profile associated with a catalog. Different sound patterns can be output for different object types and/or scenarios that the vehicle 102 may encounter, for instance. The audio value(s) 106 can, for example, be output periodically over time such that some object types and/or scenarios are associated with different periods for outputting the audio value(s) 106 (which may also vary over time). In some examples, the model component 104 can access a catalog comprising sound profiles can indicate a sound, sound pattern, period of output, etc. for a range of scenarios, objects, and the like.

In various examples, the model component 104 can output the audio value(s) 106 via one or more speakers as one or more of: audio 126, audio 128, and/or audio 130. The audio 126 can represent a first frequency range and first sound level for output in a direction at least towards the occluded region 122. In some examples, the audio 126 can include a frequency range for a specific object type that may be associated with a respective occluded region. The audio 128 can, for instance, be projected in an area of the object 108 (the bicyclist) and the occluded region 124 and may include different audio information than the audio 126 and/or the audio 130. The audio 130 can be configured to gain the attention of the group of children (the object 118) by using a frequency range and/or sound level optimized for alerting the presence of the vehicle 102 for the object type (e.g., a child). Though the object 108 is shown in front of the vehicle 102, in other examples the bicyclist may be in any other position proximate the vehicle 102 including behind the vehicle 102. Regardless of the position of the object 108, or whether or not the vehicle 102 is moving or stationary, the model component 104 can determine audio data specific for an object, scenario, or region in the environment.

In some examples, the audio 130 can continue over time until the vehicle is a threshold distance from the region 120, the children are not present in the region 120, for example. By outputting the audio 130, the vehicle 102 can provide an indication of a current position of the vehicle 102 preemptively prior to detecting whether a child is moving towards the vehicle 102, presence of a fence to contain the child, etc. The audio 128 can preemptively notify the object 116 in the occluded region 124 of the vehicle 102.

In some examples, a vehicle computing device can employ a same or different model to identify occluded regions likely to be associated with an object that can intersect with a trajectory of the vehicle at a later time. For instance, the model can determine whether an object is likely to emerge from a respective occluded region and whether the object may intersect with a candidate trajectory 132 of the vehicle 102. The candidate trajectory 132 can be received from a planning component of the vehicle computing device and can represent a current pose, velocity, and acceleration of the vehicle 102. The model can predict various object types, potential velocities, and so on to determine whether to emit audio in a direction of the occluded region. Thus, the model component 104 can output audio towards relevant occluded regions having a likelihood of including an object that can impact operation of the vehicle 102.

In various examples, the model component 104 can determine the audio value(s) 106 for output in a direction of an occluded region based at least in part on determining presence of the occluded region. In some examples, log data from the vehicle 102 (or another in a fleet of vehicles) can indicate the presence of an occluded region (e.g., which can depend on ambient light, weather conditions, and so on). In some examples, map data can be processed by the model component 104 to determine the region 120 (e.g., a school zone, playground, or other are for children). Additional details for directing sound are described in U.S. patent application Ser. No. 14/756,993, filed Nov. 4, 2015, entitled "Method for Robotic Vehicle Communication with an External Environment via Acoustic Beam Forming," which is incorporated herein by reference in its entirety and for all purposes.

As mentioned, the model component 104 can determine the audio value(s) 106 for a region such as a parking garage, a parking lot, a caution zone (e.g., an area associated with a school, retirement community, construction, hearing impaired zone (or similar), etc.), an area associated with an emergency response (e.g., to acknowledge presence of an emergency vehicle or emergency personnel, etc.). In an underground or enclosed parking garage, the audio value(s) 106 can be based on an amount of ambient light, a number of dynamic objects, an amount of noise in the environment, and so on. In other words, sensor data can be processed by a vehicle computing device to determine a frequency spectrum of the environment, and further to determine the audio value(s) 106 based at least in part on the frequency spectrum. In some examples, the model component 104 can determine audio values that may be not canceled, adjusted, or modified, by the amount of noise in the environment (e.g., ambient noise including frequencies and/or sound levels in the environment).

In various examples, the audio value(s) 106 can vary with a distance between the vehicle and a respective object or region. Over time the vehicle 102 may change position and the audio can increase or decrease to provide an indication of the vehicle 102. For instance, the audio 128 can change sound level (and remain at a same frequency range) as the distance between vehicle 102 and the bicyclist changes. In some examples, the sound level may change (e.g., increase or decrease) as a result of the object 108 moving towards the vehicle 102. The model component 104 can output audio value(s) having a first sound intensity for the object 108 at a first distance from the vehicle 102 and a second sound intensity for the object 108 at a second distance from the vehicle 102. The first sound intensity and the second sound intensity can vary while the object 108 can perceive a same level of sound intensity. That is, an absolute volume could decrease as the object 108 gets closer to the vehicle 102, however the volume experienced by the object 108 may still be the same or even louder because of the shorter distance between the vehicle 102 and the object 108.

Though the current example shows the object 108 as a bicyclist, in other examples the object can represent an animal such as a dog, a cat, a horse, or other sub-type of animal. In various examples, the model component 104 can determine the audio value(s) 106 based at least in part on the type of animal detected in the environment 100. Outputting audio continuously can cause a disturbance to one animal type and not another, based on a frequency range the animal can hear, or other reasons. By way of example and not limitation, a horse with a saddle can indicate a rider and the model component 104 can determine audio that minimizes a disturbance to the horse and rider. For example, a police officer may accompany a horse and the model component 104 can avoid outputting frequencies or sound levels that disturb the horse when determining the audio value(s) 106. In some examples, presence of a saddle, collar, proximity to a handler or pole, presence in a fenced area, or other indicator of domestication, can cause the model component 104 to refrain from outputting some or all of the audio value(s) 106. For instance, presence of a fence (or other sign of domestication) can cause the model component 104 to refrain from outing audio (or reduce a level of audio output) based at least in part on presence of the fence (or other sign of domestication).

As another non-limiting example, a dog may include a sign of domestication mentioned above, such as a leash and therefore necessitate a different level of audio presence than a dog off-leash. The model component 104 can identify a sound profile for alerting a dog, and adjust a frequency or sound level in the sound profile when alerting a dog on-leash versus off-leash. In various examples, audio value(s) 106 can include a frequency range that another object is unable to hear to minimize noise output into the environment. The model component 104 can determine audio for directing in a vicinity of a dog in the road that includes a frequency above approximately 20 kilohertz to avoid transmitting audio perceptible by a human (e.g., a frequency above a human threshold of hearing).

The model component 104 can, in examples, determine the audio value(s) 106 based at least in part on a level of attention of an object relative to the vehicle 102. For example, the vehicle computing device can implement various techniques to determine whether a person is wearing headphones, looking away from or towards the vehicle 102 (e.g., using eye gaze techniques, head movement or body analysis techniques, or the like), or otherwise paying attention to their surroundings. A sound level or frequency can be adjusted by the model component 104 to account for a level of attention by the object (e.g., a sound level can be increased when a pedestrian is not paying attention or looking towards the vehicle 102).

The model component 104 can, in various examples, determine the audio value(s) 106 based at least in part on a change in behavior of an object over time. For example, the vehicle computing device can determine whether an object has body language to indicate that the object has looked long enough at the vehicle 102 to "recognize" the vehicle or has given some other indication or acknowledgement (e.g., wave or other gesture, head or gaze tracking the location of the vehicle, etc.) that the object is aware of the vehicle. In some examples, the model component 104 can determine whether the object is speeding up or slowing down from a first time to a second time, moving towards or away from the vehicle 102, changing direction over time, etc., and determine audio data for output based on such change(s). In various examples, model component 104 can, in various examples, reduce the sound intensity or cease outputting sound based on determining whether the object detects presence of the vehicle 102.

An output from the model component 104 can, in various examples, be transmitted to a vehicle computing device to control the vehicle 102 in the environment. For instance, a planning component can determine a candidate trajectory for the vehicle 102 based at least in part on the audio data. By way of example and not limitation, the environment may have sufficient noise that the model component 104 can determine that outputting that audio from the vehicle is unlikely to reach an object (or do so with minimal efficiency), and the vehicle may change a trajectory, speed, change lanes, or the like, to improve efficiency of the audio data for reaching an object or region. In some examples, the model component 104 can determine whether or not outputting a particular sound profile, audio, etc. is efficient at a particular time, and either modify the sound profile, audio, etc., and/or control the vehicle to improve the efficiency of a respective output from the model component 104. In some examples, the vehicle 102 can change behavior (e.g., move lanes to give the object more room, etc.) until the model component 104 determines a confidence level for an output to be detected by a respective object or region.

Figure 2:
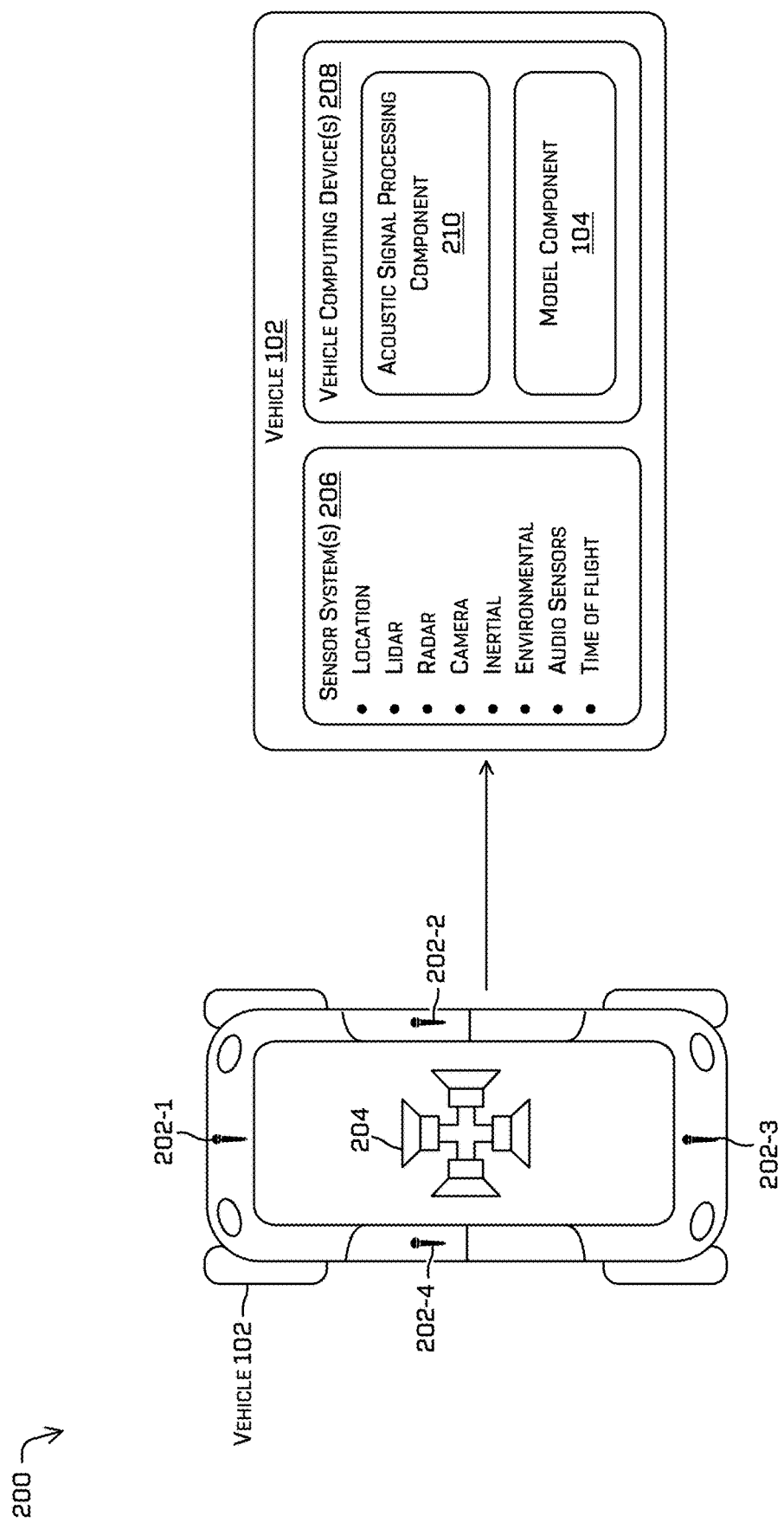
FIG. 2 is a block diagram of an example sensor system for implementing the techniques described herein.

FIG. 2 is a block diagram 200 of an example sensor system for implementing the techniques described herein. As illustrated in FIG. 2, the vehicle 102 may include one or more audio sensors (e.g., 202-1, 202-2, 202-3, and 202-4) that generate audio data representing sound in an environment of the vehicle 102. The audio sensors 202-1, 202-2, 202-3, and 202-4 can represent microphones positioned at example locations and may vary in number, size, orientation, etc. (e.g., may be microphone pairs at multiple locations of the vehicle 102 to capture sound in all directions surrounding the vehicle 102).

FIG. 2 further illustrates the vehicle 102 comprising a speaker array 204 for outputting the audio value(s) 106 from the model component 104 of FIG. 1. The speaker array can include one or more speakers, and multiple speaker arrays may be coupled to the vehicle 102 in various locations to emit sound in all directions surrounding the vehicle 102, enable beam forming, and so on.

In various examples, the audio sensors and/or the speaker array 204 in FIG. 2 are for the purpose of illustration and a different number of audio sensors and/or speakers may be disposed on the vehicle 102. The positions of the audio sensors and/or the speakers being disposed on the vehicle may vary, depending on examples. The forming of audio sensor pairs or the forming of a set of audio sensors comprising more than two audio sensors may be determined in accordance with a size and/or the computing capacity of the vehicle computing device(s) 208. Speakers may also or instead form pairs for "beaming" sound to a particular object or region. In this way, an object can receive audio at a frequency range and sound level that minimizes an effect on another object.

For the purpose of illustration, the vehicle 102 may be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle 102 at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 102 are described elsewhere.

In at least one example, the vehicle 102 can include sensor system(s) 206 disposed on the vehicle 102. The sensor system(s) 206 can include light detection and ranging (lidar) sensors, radio detection and ranging (radar) sensors, ultrasonic transducers, sound navigation and ranging (sonar) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, time of flight, etc.), wheel encoders, audio sensors (e.g., audio sensors 202-1, 202-2, 202-3, and 202-4), environment sensors (e.g., temperature sensors, humidity sensors, light sensors, pressure sensors, etc.), etc. The sensor system(s) 206 can generate sensor data, which can be utilized by one or more vehicle computing devices 208 (also referred to as a vehicle computing device 208 or vehicle computing device(s) 208) associated with the vehicle 102.

In various examples, the vehicle computing device(s) 208 may determine a direction of a first object in the environment and/or a direction of the occluded region (or second object therein) relative to the vehicle 102, and output, by the speaker array 204, audio data (e.g., the audio value(s) 106) to notify the first object or the second object in the occluded region of a current location of the vehicle 102. For instance, the speaker array 204 can direct audio to an area of the occluded region that the object is likely to exit. In various examples, the speaker array 204 can use beam forming to direct audio to one or more points of the occluded region from which an object may exit. Additional details determining occupancy of an occluded region are described in U.S. patent application Ser. No. 16/289,397, filed Feb. 28, 2019, entitled "Determining Occupancy of Occluded Regions," which is incorporated herein by reference in its entirety and for all purposes In some examples, the model component 104 can determine the audio value(s) 106 to include a sufficiently low frequency (e.g., 100 hertz to 800 kilohertz) to enable sound to reflect off a surface or obstacle (e.g., a concrete wall), or scatter towards the occluded region to increase the likelihood of reaching a potential object in the occluded region (relative to using a higher frequency, for example).

In some examples, the vehicle computing device(s) 208 may determine a direction of arrival (DoA) of an audio source in the environment based at least in part on audio data received from the sensor system(s) 206 associated with the vehicle 102. The audio data, i.e., the raw audio data, from the audio source(s) in the environment of the vehicle 102 may be collected, captured, received, or otherwise determined by the audio sensor(s) 202-1, 202-2, 202-3, and 202-4. The raw audio data or the raw data may refer to audio data or data captured by the audio sensors that may be uncompressed. Alternatively, the raw audio data and the raw data may refer to audio data or data captured by the audio sensors that may be compressed but that otherwise remain unprocessed.

In some examples, the vehicle computing device may be configured to receive, detect, infer, estimate, or otherwise determine first audio data representing sound in the environment 100, and generate the audio value(s) 106 based at least in part on the first audio data. In some examples, the computing device(s) 208 of the vehicle 102 may include an acoustic signal processing component 210 that processes the audio data or audio signal representing the sound in an environment. The acoustic signal processing component 210 may include one or more models to analyze the audio data and identify a spectrum of frequencies and/or sound levels in the environment. In some examples, the acoustic signal processing component 210 may provide the spectrum data, or other data, to the model component 104 for further processing. In such examples, the model component 104 can identify which sound levels and/or frequencies of the first spectrum data to adjust as output data (e.g., the audio value(s) 106).

The first audio data may be received from the audio sensors as signals associated with objects (e.g., original sources of sounds and/or objects from which sound is reflected). For example, the first audio data may be captured via sensors as first sound associated with a first object, second audio data may be captured via sensors as second sound associated with a second object, and third audio data may be captured via sensors as third sound associated with a third object, and so on. The first object, the second object, and the third object may each be a different object from one another, or a same object as one or more of the other objects (e.g., the first object may be ultimately a same object as the second object, and a different object from the third object). In some examples, the first audio data may be captured via a first pair of audio sensors as first sound associated with a first object, the second audio data may be captured via a second pair of audio sensors as second sound associated with a second object, and the third audio data may be captured via a third pair of audio sensors as third sound associated with a third object, and so on.

In some examples, a vehicle may receive audio data via audio sensors (e.g., a pair of audio sensors) as a direct signal (e.g., a sound originating from a source without any reflections-a direct sound) associated with an object (e.g., a source of the sound) or as a reflected signal (e.g., a reflected sound) whereby the sound is generated by the object and reflected off of an object in the environment prior to being captured by audio sensors of the vehicle. In some examples, reflected sound may be received with or without direct sound.

In some examples, the acoustic signal processing component 210 can provide functionality to "pre-process" the audio data prior to it being entered into the model component 104. For example, the acoustic signal processing component 210 can be configured to identify frequency information and/or sound level or intensity information associated with the audio data.

In some examples, the vehicle computing device(s) 208 may determine, based at least in part on the information received from acoustic signal processing component 210, a direction of a source of the audio event relative to the vehicle (or a sensor of the vehicle), and optionally control the vehicle and/or determine audio data for output based at least in part on the direction associated with the source of the audio event.

Figure 3:
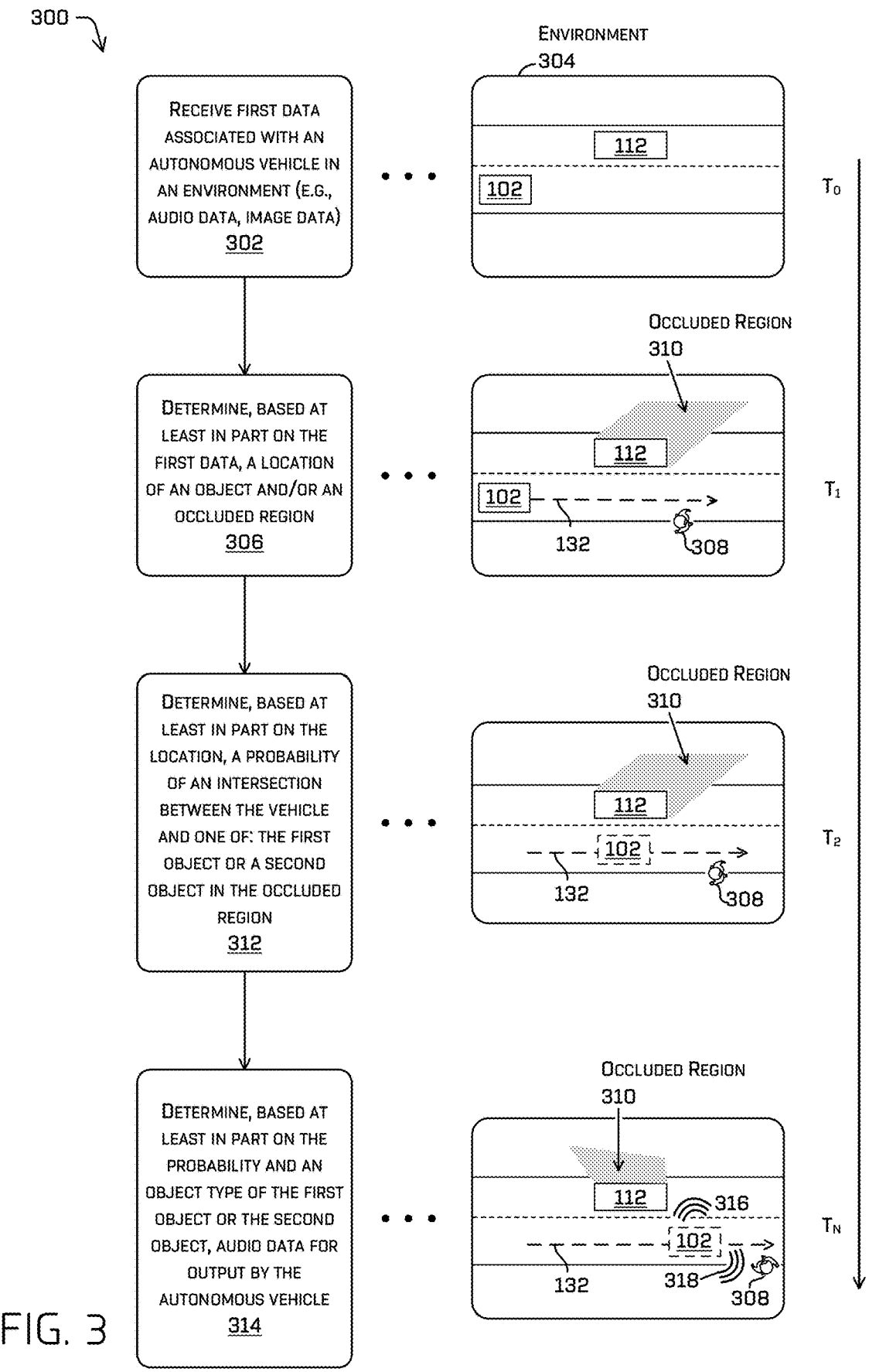
FIG. 3 is a pictorial diagram illustrating an example process by an example computing device to determine audio for output by an example vehicle as described herein.

FIG. 3 is a pictorial diagram illustrating an example process 300 by an example computing device to determine audio for output by an example vehicle as described herein. The example process 300 may be implemented by a computing device such as the vehicle computing device(s) 208 of FIG. 2, the vehicle computing device(s) 404 of FIG. 4, and/or the computing device(s) 436. By way of example and not limitation, the example process 300 may be used to determine the audio value(s) 106 for output by the speaker array 204 of the vehicle 102 to proactively announce presence of the vehicle 102 in an environment. In various examples, the computing device can determine different audio data for various objects of different object types.

In some examples, the example process 300 can be performed by the vehicle 102 as it traverses the environment 304. For instance, FIG. 3 illustrates time $T_1, T_2, \ldots, T_N$ (where N is an integer) to indicate a sequence of time among the operations.

An operation 302 can include receiving first data associated with an autonomous vehicle in an environment. For example, a computing device can implement the model component 104 to receive input data representing one or more of: sensor data, audio data, image data, map data, inertia data, vehicle state data, historical data (log data), or the like. In some examples, the first data can include audio from an environment 304 representing sounds from the object 112, weather, among others. The environment 304 can be a real-world environment or a simulated environment, depending on examples.

In some examples, the operation 302 can include the vehicle receiving data from one or more microphones configured to capture audio data in the environment 304 over time. The model component 104 can analyze the audio data to identify frequencies and associated sound levels thereof as a basis for sound emitted by the environment 304. In some examples, the sound can be associated with static objects and/or dynamic objects in the environment 304.

The first data may also or instead represent log data from one or more vehicles that operated in the environment 304 at a previous time. The log data may indicate presence of an occluded region (which may vary by time of day, time of the year, etc.), presence of animals and whether or not the animals previously entered a roadway, etc. The log data may indicate previous weather conditions, that may impact sound and/or visibility in the environment.

An operation 306 can include determining, based at least in part on the first data, a location of an object and/or an occluded region. For example, the operation 306 can include the model component 104 determining a first location of the object 112, a second location of the object 308 (e.g., a pedestrian), and/or a third location of the occluded region 310. The location(s) can, for instance, represent a position of an object or region relative to the vehicle 102 and/or relative to a coordinate system. In some examples, the location can include a point to represent an object or region while in other examples the location can represent an area in two-dimensional space, three-dimensional space, or the like.

In some examples, the model component 104 can determine audio data for output based at least in part on the location of the object or occluded region. The vehicle 102 can emit, for instance, first audio data 316 towards the occluded region 310 and second audio data 318 towards the object 308. In some examples, the first audio data 316 can be configured for an object type that previously occupied the occluded region 310 (e.g., a frequency above human hearing for an animal in the occluded region or a frequency or sound level for reflecting off a surface to reach the occluded area with sufficient amplitude to cause the animal to hear the vehicle 102). In various examples, a size or shape of the occluded region 310 can change over time as the vehicle 102 traverses the environment 304.

In various examples, the model component 104 can receive sensor data from one or more sensors (e.g., coupled to the vehicle 102 and/or in the environment 304) over time, and use the sensor data to determine a change in behavior of the object 308 over time. For example, the sensor data can represent or otherwise be used to generate object state data associated with the object 308 indicative of a change in direction (e.g., moves toward the vehicle 102), velocity, and so on.

An operation 312 can include determining, based at least in part on the location, a probability of an intersection between the vehicle and one of: the first object or a second object in the occluded region. For example, the operation 312 can include the computing device(s) 208 determining a probability of a trajectory associated with the vehicle (e.g., the candidate trajectory 132) intersecting with one of: an object (e.g., a predicted object trajectory) and/or a potential object in an occluded region. In some examples, a prediction component can determine one or more object trajectories for an object(s) in the environment. A model or component of the computing device(s) 208 can determine a probability for an object, or object type, to occupy the occluded region 310. Additional details of determining occupancy of an occluded region are described in U.S. patent application Ser. No. 17/124,385, filed Dec. 31, 2020, entitled "Object Determination in an Occluded Region," which is incorporated herein by reference in its entirety and for all purposes.

An operation 314 can include determining, based at least in part on the probability and an object type of the first object or the second object, audio data for output by the autonomous vehicle. For example, the operation 314 can include the computing device(s) 208 implementing the model component 104 to output the audio value(s) 106 based on the probability of the intersection between the vehicle and one of: the first object or the second object in the occluded region being above a threshold value. In some examples, the audio data for the first object and/or the second object can be output based on the probability of intersection meeting or exceeding the threshold value (e.g., if the probability of intersection is below the threshold then the audio data may not be output or may be output at a different sound level).

The audio data is represented in FIG. 3 by at least one of: first audio data 316 for output at least in a direction of the occluded region 310 and second audio data 318 for output at least in a direction of the object 308. Note that at time Ty, the object 308 has turned toward the vehicle 102 and the model component can detect that the body and/or eyes of the object 308 are either looking towards the vehicle 102 or looking away from the vehicle 102, and adjust or otherwise determine the audio data based at least in part on the detection.

In some examples, the model component 104 can determine an object type of the first object or the second object, and generate the audio data based on the object type. For instance, the model component 104 can access data from a storage device representing a catalog of different object types and sub-types and an associated sound profile. The sound profile can indicate how the object type reacts to sound (e.g., a frequency range, minimum sound level, etc.) including how the object type reacts in different ambient light and/or weather conditions, just to name a few. For instance, the object type can be another vehicle, a human, an animal, etc., and may further include a sub-type of human (e.g., child, person with headphones, person with cane, etc.) a sub-type of animal (e.g., a dog, a horse, cow, monkey, etc.).

In various examples, an example sound profile may also or instead indicate frequency information and/or sound level information for the object type or the sub-type. A time of day can effect behavior of an animal, and the sound profile can indicate whether the sub-type of animal has hooves (e.g., or other features affecting mobility on asphalt), is nocturnal (e.g., identifies behavior such as an animal "freezing" in bright light), and so on. In examples when the sub-type identifies different types of humans or vehicles (e.g., truck, convertible, motorcycle, etc.), the sound profile can include audio data for presenting to the different types that maximum attention by determine audio that meets requirements specified by an entity (e.g., a law requiring a minimal level of sound production by the vehicle) with consideration to using a minimum sound level (e.g., to avoid noise pollution). By way of example and not limitation, a motorcycle can be associated with a sound profile identifying higher sound levels than a sedan due to the relatively higher level of noise produced by some motorcycles. In another non-limiting example, a racoon can require a different sound profile and audio data than another animal based on the unique characteristics of the racoon.

In some examples, a sound profile can indicate a sound for use when there are multiple vehicles in region and at least one other vehicle is outputting a particular sound. The model component 104 can determine a sound profile that is different from the current sound in the environment to differentiate from the other vehicle (e.g., to avoid having all the vehicles from a same fleet making a similar noise in a relatively small space). The model component 104 can, upon detecting the sound of another vehicle, determine audio values or otherwise select a sound profile from a catalog of sound profiles so that sound from the other vehicle and the vehicle 102 have a minimal level of interfere relative to one another (e.g., the receiving object becomes confused from receiving the same sound from different locations).

In various examples, the vehicle 102 can optionally output visual indicators in conjunction with the audio data to announce presence of the vehicle to a location occupied by an object or region. For instance, a visual indicator can be output to improve a reaction of the object to the audio data.

As mentioned, in some examples, the audio data can be determined without requiring operation 314 or independent of determining the aforementioned probability and/or object type. In other words, a probability of intersection with an object or potential object in an occluded region may be omitted and the audio data can instead be based on determining a location of the object and/or a location of the occluded region. In some examples, the location determination can be based on previously determined data such as log data, map data, and previous sensor data, for example, and the audio data can be determining independent of requiring current sensor data (data from the vehicle 102 to determine presence of an object or occluded region). The occluded region can, for example, be determined from map data compiled based at least in part on from data received from one or more vehicles in a fleet (including vehicle 102). The log data and/or map data may, for instance, indicate presence of dynamic objects (e.g., a dog in a fenced yard at certain times of day, and so on) to determine whether or not the vehicle should emit the audio data.

In some examples, the computing device(s) 208 (or a remote computing device) can process output(s) from the model component 104 to generate a map showing audio data output by one or more vehicles in the environment. For instance, a remote teleoperation center may receive outputs from the model component 104 and generate or update a three dimensional map usable by a fleet of autonomous vehicles to determine locations for various sounds in the environment (e.g., using the aforementioned sound profiles).

While described as a separate system, in some examples, techniques to determine audio data as described in relation to FIGS. 1-3 may be implemented by other vehicle systems, components, and/or computing devices. For example, and as will be described in further detail with regard to FIG. 4, the audio techniques described herein in relation to FIGS. 1-3 may be implemented at least partially by or in association with a perception component, a prediction component, a planning component, and/or a model component of FIG. 4.

Figure 4:
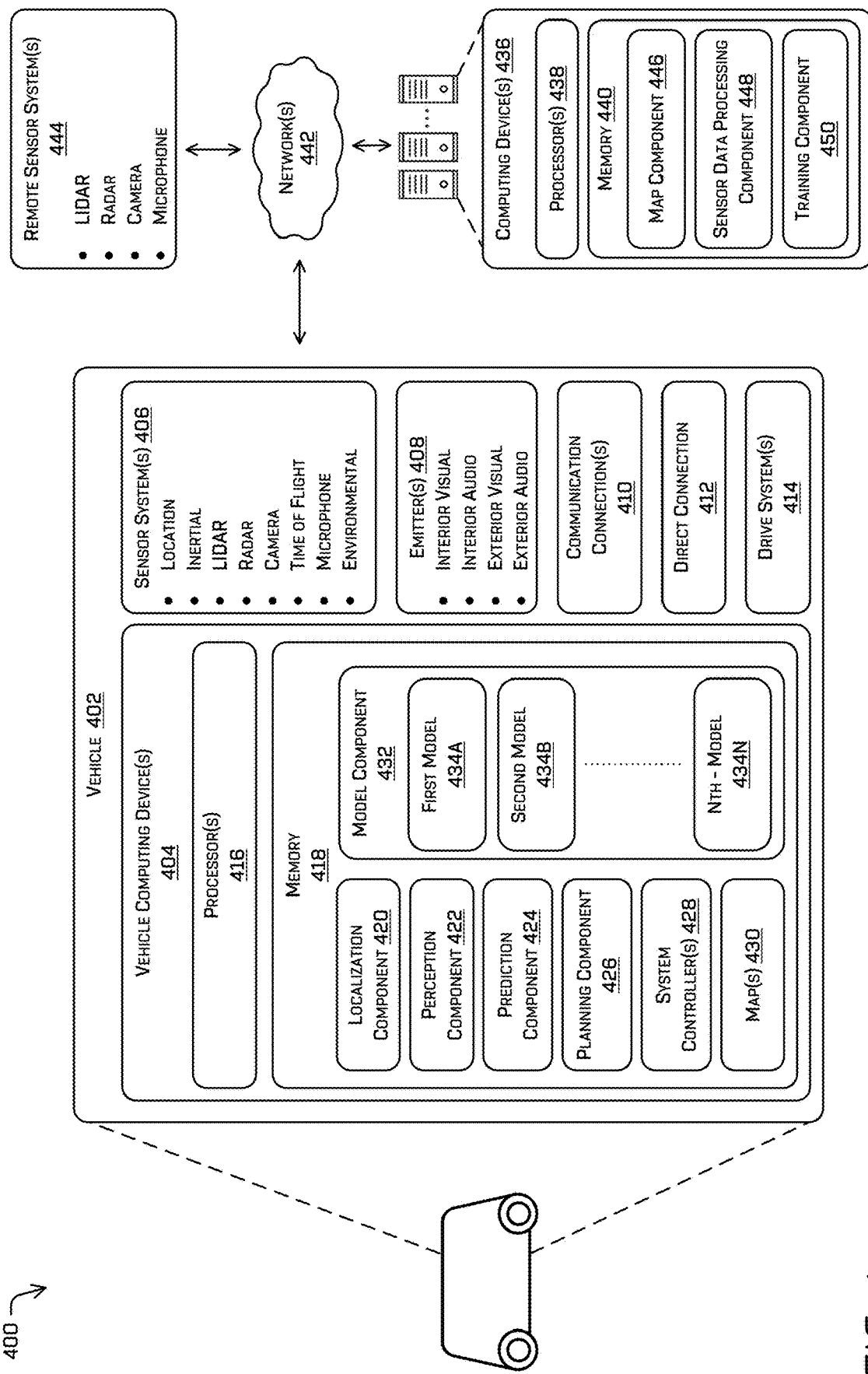
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402.

The vehicle 402 may include a vehicle computing device(s) 404, one or more sensor systems 406, one or more emitters 408, one or more communication connections 410, at least one direct connection 412, and one or more drive system(s) 414.

The vehicle computing device(s) 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In various examples, the vehicle computing device(s) 404 may store sensor data associated with actual location of an object at the end of the set of estimated states (e.g., end of the period of time) and may use this data as training data to train one or more models. In some examples, the vehicle computing device(s) 404 may provide the data to a remote computing device (i.e., computing device separate from vehicle computing device such as the computing device(s) 436) for data analysis. In such examples, the remote computing device(s) may analyze the sensor data to determine an actual location, velocity, direction of travel, or the like of the object at the end of the set of estimated states.

In the illustrated example, the memory 418 of the vehicle computing device(s) 404 stores a localization component 420, a perception component 422, a prediction component 424, a planning component 426, one or more system controllers 428, one or more maps 430, and a model component 432 including one or more model(s), such as a first model 434A, a second model 434B, up to an Nth model 434N (collectively "models 434"), where N is an integer. Though depicted in FIG. 4 as residing in the memory 418 for illustrative purposes, it is contemplated that the localization component 420, the perception component 422, the prediction component 424, the planning component 426, one or more system controllers 428, one or more maps 430, and/or the model component 432 including the model(s) 434 may additionally, or alternatively, be accessible to the vehicle 402 (e.g., stored on, or otherwise accessible by, memory remote from the vehicle 402, such as, for example, on memory 440 of a remote computing device 436).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or map component 446, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 426 can select a trajectory for the vehicle 402 based at least in part on receiving data representing an output of the model component 432.

In other examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage. Additionally or alternatively, the planning component 426 can determine the path for the vehicle 402 to follow based at least in part on data received from a simulation component and/or the model component 104 as described in FIGS. 1-3 and elsewhere.

In at least one example, the vehicle computing device(s) 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In examples, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 442. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

As illustrated in FIG. 4, the vehicle computing device(s) 404 may include a model component 432. The model component 432 may be configured to perform the functionality of the model component 104, including predicting audio for different objects and regions, such as the audio value(s) 106 of FIG. 1. In various examples, the model component 432 may receive one or more features associated with the detected object(s) from the perception component 422 and/or from the sensor system(s) 406. In some examples, the model component 432 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the model component 432 could be part of the prediction component 424, the planning component 426, or other component(s) of the vehicle 402.

In various examples, the model component 432 may send predictions from the one or more models 434 that may be used by the prediction component 424 and/or the planning component 426 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 426 may determine one or more actions (e.g., reference actions and/or sub-actions) for the vehicle 402, such as vehicle candidate trajectories. In some examples, the model component 432 may be configured to determine audio data for emitting into a portion of an environment based at least in part on the one or more actions for the vehicle 402. In some examples, the model component 432 may be configured to determine audio characteristics that are applicable to the environment, such as based on environment characteristics, weather characteristics, or the like.

In various examples, the model component 432 may utilize machine learned techniques to predict audio associated with an object or region. In such examples, the machine learned algorithms may be trained to determine, based on sensor data and/or previous predictions by the model, that an object is likely to behave in a particular way relative to the vehicle 402 at a particular time during a set of estimated states (e.g., time period). In such examples, one or more of the vehicle 402 state (position, velocity, acceleration, trajectory, etc.) and/or the object state, classification, etc. may be input into such a machine learned model and, in turn, a behavior prediction may be output by the model.

In various examples, characteristics associated with each object type may be used by the model component 432 to determine frequency information, sound intensity, and other characteristics for one or more objects. Examples of characteristics of an object type may include, but not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 420, the perception component 422, the prediction component 424, the planning component 426, the one or more system controllers 428, the one or more maps 430, the model component 432 including the model(s) 434 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device(s) 404. Additionally, or in the alternative, the sensor system(s) 406 may send sensor data, via the one or more networks 442, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 436, other nearby vehicles, etc.) and/or one or more remote sensor system(s) 444 for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device(s) 404 to another computing device or a network, such as network(s) 442. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 424, the planning component 426, the one or more system controllers 428, the one or more maps 430, and the model component 432, may process sensor data, as described above, and may send their respective outputs, over the one or more network(s) 442, to the computing device(s) 436. In at least one example, the localization component 420, the perception component 422, the prediction component 424, the planning component 426, the one or more system controllers 428, the one or more maps 430, and the model component 432 may send their respective outputs to the remote computing device(s) 436 at a particular frequency, after a lapse of a predetermined period of time, in near real-time, etc.

In some examples, the vehicle 402 may send sensor data to the computing device(s) 436 via the network(s) 442. In some examples, the vehicle 402 may receive sensor data from the computing device(s) 436 and/or remote sensor system(s) 444 via the network(s) 442. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440 storing the map component 446, a sensor data processing component 448, and a training component 450. In some examples, the map component 446 may include functionality to generate maps of various resolutions. In such examples, the map component 446 may send one or more maps to the vehicle computing device(s) 404 for navigational purposes. In various examples, the sensor data processing component 448 may be configured to receive data from one or more remote sensors, such as sensor system(s) 406 and/or remote sensor system(s) 444. In some examples, the sensor data processing component 448 may be configured to process the data and send processed sensor data to the vehicle computing device(s) 404, such as for use by the model component 432 (e.g., the model(s) 434). In some examples, the sensor data processing component 448 may be configured to send raw sensor data to the vehicle computing device(s) 404.

In some instances, the training component 450 can include functionality to train a machine learning model to output evaluate trajectories. For example, the training component 450 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 450 may be executed by the processor(s) 438 to train a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with evaluated trajectories and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 450 can include functionality to train a machine learning model to output classification values. For example, the training component 450 can receive data that represents labelled collision data (e.g., publicly available data, sensor data, and/or a combination thereof). At least a portion of the data can be used as an input to train the machine learning model. Thus, by providing data where the vehicle traverses an environment, the training component 450 can be trained to output potential intersection(s) associated with objects, as discussed herein.

In some examples, the training component 450 can include training data that has been generated by a simulator. For example, simulated training data can represent examples where a vehicle collides with an object in an environment or nearly collides with an object in an environment, to provide additional training examples.

The processor(s) 416 of the vehicle 402 and the processor(s) 438 of the computing device(s) 436 may be any suitable processor capable of executing instructions to process data and perform operations as described herein. By way of example and not limitation, the processor(s) 416 and 438 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of non-transitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

Figure 5:
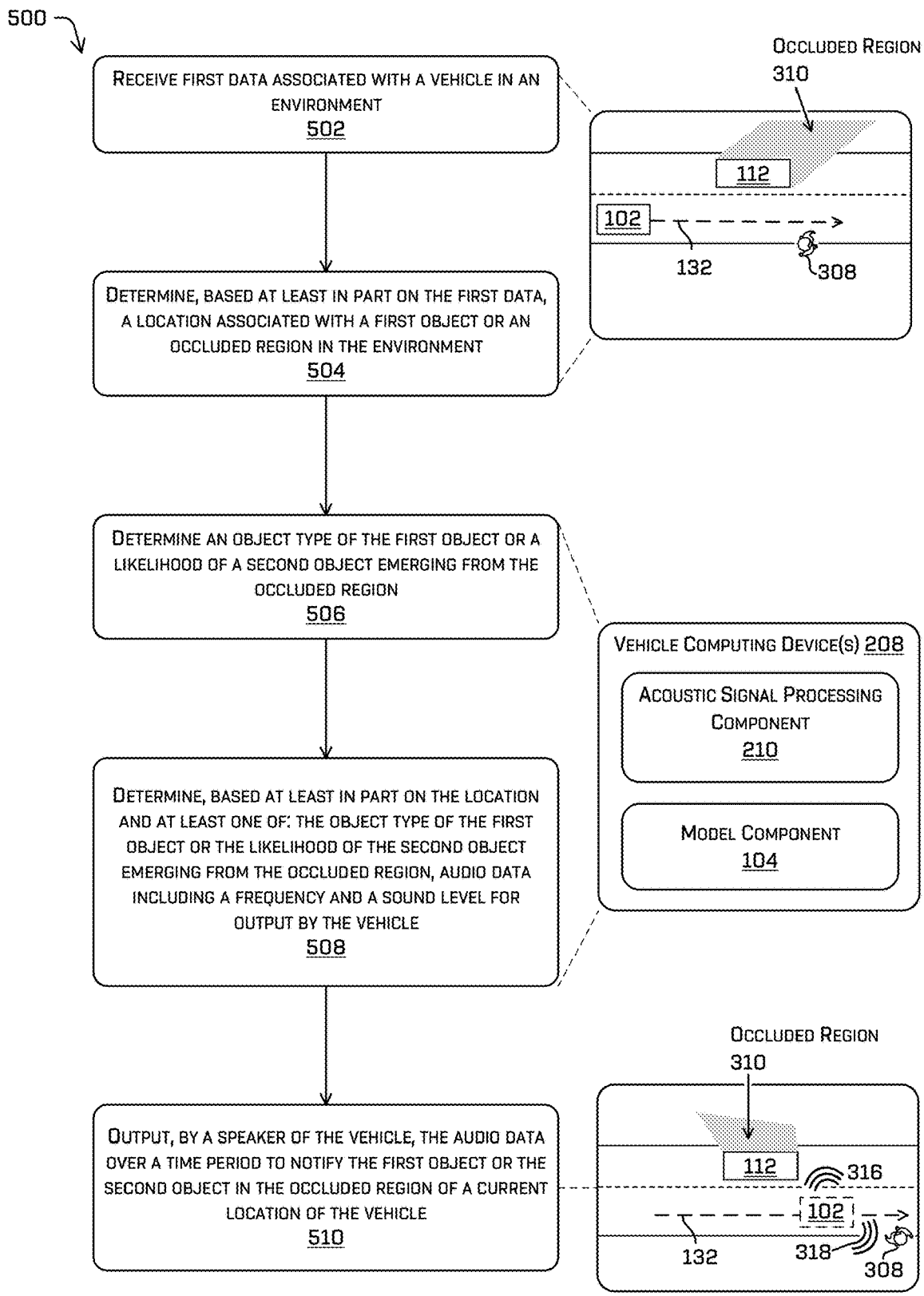
FIG. 5 is a flowchart depicting an example process for determining audio data using one or more example models.

FIG. 5 is a flowchart depicting an example process 500 for determining audio data using one or more example models. For example, some or all of the process 500 can be performed by one or more components in one or more of FIGS. 1-4, as described herein. For example, some or all of the process 500 can be performed by the vehicle computing device(s) 404 or the computing device(s) 208.

At operation 502, the process may include receiving first data associated with a vehicle in an environment. In some examples, the operation 502 may include capturing first audio data of an environment surrounding the vehicle by one or more audio sensors, a first pair of audio sensors, multiple pairs of audio sensors, or a combination thereof, of the vehicle 102. The first data may also or instead represent sensor data, log data, map data, or ambient sound within a threshold distance of the vehicle 102.

At operation 504, the process may include determining, based at least in part on the first data, a location associated with a first object or an occluded region in the environment. In some examples, the operation 504 may include a model, such as the model component 104, determining a location of an object and/or a region surrounding the vehicle 102. The object may correspond to a human, animal, etc., and the region may include a parking lot (e.g., covered, underground, etc.), an area of limited visibility (e.g., a horizon, bright weather, an area with a kiosk or a relatively large number of pedestrians, etc.), and/or an occluded region, just to name a few. In some examples, the object may represent a jogger along a roadway, a human walking a dog on a sidewalk, a horse with a saddle accompanied by a human handler, though other object types and/or scenarios are also contemplated.

At operation 506, the process may include determining an object type of the first object or a likelihood of a second object emerging from the occluded region. In some examples, the operation 506 may include inputting the first data into the model component 104, or other component or model of the computing device, and receiving output data indicative of an object type for one or more objects in the environment. Additionally, or alternatively, the operation can include determining a probability that an object may occupy the occluded region and/or a likelihood for the object to emerge from the occluded region. In various examples, the model can predict which type of object that may exit the occluded region and a heading, average velocity, or other state data for the occluded object.

At operation 508, the process may include determining, based at least in part on the location and one of: the object type of the first object or the likelihood of the second object emerging from the occluded region, audio data including a frequency and a sound level for output by the vehicle. In some examples, the operation 508 may include the model component 104 generating one or more audio value(s) (e.g., audio value(s) 106) for output by a speaker (e.g., the speaker array 204) of the vehicle in a direction at least toward the first object or the second object.

In various examples, the audio data can be determined based on frequencies and/or intensities of such frequencies so that the audio data differs from a current "noise" in the environment. For example, the first data can include first audio data for a time period in the environment, and the model component 104 can determine second audio data having a frequency spectrum and/or other sound characteristic (e.g., sound level, peak amplitude, etc.) to improve the effect of the second audio data on gaining attention of the first object or the second object.

By way of example and not limitation, the first data of operation 302 can include historical data and/or substantially real-time sensor data usable by a model to predict a risk level for an object to intersect with the vehicle 102. For example, a prediction component of a vehicle computing device can determine a potential intersection between a trajectory of the vehicle and a trajectory of an object, and output a level of risk for the object. In some examples, the level of risk for the vehicle can be associated with determining presence of one or more occluded regions. The level of risk can vary according to a variety of criteria such as whether the object is paying attention to the vehicle, a number of occluded regions, weather conditions, ambient light, object type, a change in object behavior over time, among others. In some examples, the model component 104 can determine the audio data based at least in part on a first distance between the vehicle and the object, a second distance between the vehicle and a region (e.g., an occluded region, a parking lot, etc.), a sound level of the environment, and/or presence of a school zone, playground, underground parking garage, kiosk, crosswalk, or other region in the environment.

In some examples, the model component 104 can represent a machine learned model trained to determine the audio data based at least in part on a predicted intersection between the vehicle and the first object and/or the second object potentially in the occluded region. The machine learned model can receive a variety of input data to generate a sound profile for output by a speaker of the vehicle that is optimized for reaching the particular object with a minimum intensity for recognition by the respective object. In various examples, the sound profile can identify a frequency range and/or sound levels that meet requirements associated with a motor vehicle safety standard (e.g., a signal to noise ratio requirement issued by a Motor Safety Standard or Safety Administrator).

At operation 510, the process may include outputting, by a speaker of the vehicle, the audio data over a time period to notify the first object or the second object in the occluded region of a current location of the vehicle. In some examples, the operation 510 may include the vehicle 102 outputting the audio value(s) 106 by one or more speakers. In various examples, the computing device can determine a direction of the first object or the second object in the occluded region, and the model component 104 can output instructions for outputting the audio data towards the first object or the second object based at least in part on the direction. For example, the model component 104 can determine audio value(s) 106 for a plurality of speakers of the vehicle to emit a sound beam in a direction towards the first object and/or towards the occluded region (e.g., at a point at which an object may emerge). In some examples, multiple sound beams can be simultaneously output in one or more directions to enable the vehicle 102 to notify different objects and/or regions (or objects therein) of a current vehicle position.

In some examples, the audio data can include human-understandable words and/or phrases that promote safety by indicating a presence of the vehicle 102 and/or provide instructions for responding to an emergency or other event in the vicinity of the vehicle 102.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, operations 302, 306, and 314 may be performed without operation 312. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving first data associated with an autonomous vehicle in an environment; determining, based at least in part on the first data, a first location of a first object or a second location of an occluded region in the environment; determining, based at least in part on the first location or the second location, a probability of an interaction between the autonomous vehicle and the first object or a likelihood that a second object is in the occluded region; determining, based at least in part on the probability and an object type of the first object or the likelihood that the second object is in the occluded region, first audio data for output by the autonomous vehicle; adjusting, as second audio data, a frequency and a second sound level of the first audio data based at least in part on criteria indicating one or more of: weather in the environment, a sub-type of the first object or the second object, ambient light in the environment, a level of attention by the first object, a distance between the autonomous vehicle and one of the first object or the occluded region, a first sound level of the environment, or presence of a caution zone; and outputting, by a speaker of the autonomous vehicle, the second audio data to notify the first object or the second object in the occluded region of a current location of the autonomous vehicle.

B: The system of paragraph A, wherein the first data represents one or more of: sensor data from a sensor coupled to the autonomous vehicle, log data, map data, or weather data.

C: The system of paragraph A or B, the operations further comprising: determining a direction of the first object or the second object in the occluded region relative to the autonomous vehicle, wherein outputting the second audio data comprises targeting the second audio data towards the first object or the second object based at least in part on the direction.

D: The system of any of paragraphs A-C, wherein the autonomous vehicle includes a plurality of speakers, the operations further comprising: beam forming the second audio data in a direction towards the first object or the occluded region.

E: The system of any of paragraphs A-D, the operations further comprising: receiving, from a first machine learned model, a predicted intersection between the autonomous vehicle and the first object; inputting, into a second machine learned model, the predicted intersection and the first data representing audio data in the environment; and receiving, from the second machine learned model, a sound profile comprising the frequency and the second sound level for output by the autonomous vehicle.

F: A method comprising: receiving first data associated with a vehicle in an environment; determining, based at least in part on the first data, a location associated with a first object or an occluded region in the environment; determining an object type of the first object or a likelihood of a second object emerging from the occluded region; determining ambient sound in the environment; determining, based at least in part on the location, the ambient sound, and at least one of: the object type of the first object or the likelihood of the second object emerging from the occluded region, audio data including a frequency and a sound level for output by the vehicle; and outputting, by a speaker of the vehicle, the audio data over a time period to notify the first object or the second object in the occluded region of a the vehicle's presence.

G: The method of paragraph F, wherein: the sound level is a first sound level, and determining the audio data is further based at least in part on one or more of: weather in the environment, a sub-type of the first object or the second object, ambient light in the environment, a level of attention by the first object, a distance between the vehicle and one of the first object or the occluded region, a second sound level of the environment, or presence of a school zone.

H: The method of paragraph G, further comprising: receiving, from a first machine learned model, a predicted intersection between the vehicle and the first object; inputting, into a second machine learned model, the predicted intersection and the first data representing audio data in the environment; and receiving, from the second machine learned model, a sound profile comprising the frequency and the sound level for output by the vehicle.

I: The method of any of paragraphs F-H, wherein the first data represents one or more of: sensor data from a sensor coupled to the vehicle, log data, map data, or weather data.

J: The method of any of paragraphs F-I, further comprising: determining a first location of the first object or a second location associated with the occluded region relative to the vehicle, wherein outputting the audio data comprises targeting the audio data towards the first object or the second object based at least in part on the first location or the second location.

K: The method of paragraph J, further comprising: determining a portion of the occluded region from which the second object is likely to exit; wherein the second location represents the portion of the occluded region from which the second object is likely to exit.

L: The method of any of paragraphs F-K, further comprising: determining, based at least in part on a change in position by the first object or the second object relative to the vehicle, has increased from a first time to a second time after the first time; and modifying the sound level of the audio data from the first time to the second time based at least in part on the change in position by the first object or the second object.

M: The method of any of paragraphs F-L, further comprising: determining whether the first object detects presence of the vehicle; and determining the audio data based at least in part on whether the first object recognizing or acknowledging presence of the vehicle.

N: The method of any of paragraphs F-M, further comprising: determining a likelihood of an intersection between a first trajectory associated with the vehicle and a second trajectory associated with the first object; and determining the audio data based at least in part on the likelihood.

O: The method of any of paragraphs F-N, further comprising: identifying an intensity or a frequency of sound associated with the environment; and determining the audio data based at least in part on the intensity or the frequency of sound associated with the environment.

P: The method of any of paragraphs F-O, wherein the frequency of the audio data is above a human threshold of hearing.

Q: One or more non-transitory computer-readable media storing instructions executable by a processor, wherein the instructions, when executed, cause the processor to perform operations comprising: receiving first data associated with a vehicle in an environment; determining, based at least in part on the first data, a location associated with a first object or an occluded region in the environment; determining an object type of the first object or a likelihood of a second object emerging from the occluded region; determining, based at least in part on the location and at least one of: the object type of the first object or the likelihood of the second object emerging from the occluded region, audio data including a frequency and a sound level for output by the vehicle; and outputting, by a speaker of the vehicle, the audio data over a time period to notify the first object or the second object in the occluded region of a current location of the vehicle.

R: The one or more non-transitory computer-readable media of paragraph Q, wherein: the sound level is a first sound level, and determining the audio data is further based at least in part on one or more of: weather in the environment, a sub-type of the first object or the second object, ambient light in the environment, a level of attention by the first object, a distance between the vehicle and one of the first object or the occluded region, a second sound level of the environment, or presence of a school zone.

S: The one or more non-transitory computer-readable media of paragraph Q or R, the operations further comprising: emitting a sound beam using a plurality of speakers in a direction towards the first object or the occluded region.

T: The one or more non-transitory computer-readable media of any of paragraphs Q-S, the operations further comprising: determining, based at least in part on a change in position by the first object or the second object relative to the vehicle, has increased from a first time to a second time after the first time; and increasing the sound level of the audio data from the first time to the second time based at least in part on the change in position by the first object or the second object.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
   receiving first data associated with a vehicle in an environment;
   determining, based at least in part on the first data, a location associated with a first object that causes an occluded region in the environment relative to the vehicle;
   determining an object type of the first object or a likelihood of a second object emerging from the occluded region;
   determining ambient sound in the environment;
   determining, based at least in part on the location, the ambient sound, and at least one of: the object type of the first object or the likelihood of the second object emerging from the occluded region, audio data including a frequency and a sound level for output by the vehicle; and
   outputting, by a speaker of the vehicle, the audio data over a time period to notify the first object or the second object in the occluded region of the vehicle's presence.

2. The method of claim 1, wherein:
   the sound level is a first sound level, and
   determining the audio data is further based at least in part on one or more of: weather in the environment, a sub-type of the first object or the second object, ambient light in the environment, a level of attention by the first object, a distance between the vehicle and one of the first object or the occluded region, a second sound level of the environment, or presence of a school zone.

3. The method of claim 2, further comprising:
   receiving, from a first machine learned model, a predicted intersection between the vehicle and the first object;
   inputting, into a second machine learned model, the predicted intersection and the first data representing audio data in the environment; and
   receiving, from the second machine learned model, a sound profile comprising the frequency and the sound level for output by the vehicle.

4. The method of claim 1, wherein the first data represents one or more of: sensor data from a sensor coupled to the vehicle, log data, map data, or weather data.

5. The method of claim 1, further comprising:
   determining a first location of the first object or a second location associated with the occluded region relative to the vehicle,
   wherein outputting the audio data comprises targeting the audio data towards the first object or the second object based at least in part on the first location or the second location.

6. The method of claim 5, further comprising:
determining a portion of the occluded region from which the second object is likely to exit;
wherein the second location represents the portion of the occluded region from which the second object is likely to exit.

7. The method of claim 1, further comprising:
determining, based at least in part on a change in position by the first object or the second object relative to the vehicle, has increased from a first time to a second time after the first time; and
modifying the sound level of the audio data from the first time to the second time based at least in part on the change in the position by the first object or the second object.

8. The method of claim 1, further comprising:
determining whether the first object detects presence of the vehicle; and
determining the audio data based at least in part on whether the first object recognizing or acknowledging presence of the vehicle.

9. The method of claim 1, further comprising:
determining a likelihood of an intersection between a first trajectory associated with the vehicle and a second trajectory associated with the first object; and
determining the audio data based at least in part on the likelihood.

10. The method of claim 1, further comprising:
identifying an intensity or a frequency of sound associated with the environment; and
determining the audio data based at least in part on the intensity or the frequency of sound associated with the environment.

11. The method of claim 1, wherein the frequency of the audio data is above a human threshold of hearing.

12. One or more non transitory computer readable media storing instructions executable by a processor, wherein the instructions, when executed, cause the processor to perform operations comprising:
receiving first data associated with a vehicle in an environment;
determining, based at least in part on the first data, a location associated with a first object that causes an occluded region in the environment relative to the vehicle;
determining an object type of the first object or a likelihood of a second object emerging from the occluded region;
determining ambient sound in the environment;
determining, based at least in part on the location and at least one of: the object type of the first object or the likelihood of the second object emerging from the occluded region, audio data including a frequency and a sound level for output by the vehicle; and
outputting, by a speaker of the vehicle, the audio data over a time period to notify the first object or the second object in the occluded region of the vehicle's presence.

13. The one or more non transitory computer readable media of claim 12, wherein:
the sound level is a first sound level, and
determining the audio data is further based at least in part on one or more of: weather in the environment, a sub-type of the first object or the second object, ambient light in the environment, a level of attention by the first object, a distance between the vehicle and one of the first object or the occluded region, a second sound level of the environment, or presence of a school zone.

14. The one or more non transitory computer readable media of claim 12, the operations further comprising:
emitting a sound beam using a plurality of speakers in a direction towards the first object or the occluded region.

15. The one or more non transitory computer readable media of claim 12, the operations further comprising:
determining, based at least in part on a change in position by the first object or the second object relative to the vehicle, has increased from a first time to a second time after the first time; and
increasing the sound level of the audio data from the first time to the second time based at least in part on the change in the position by the first object or the second object.

16. A system comprising:
one or more processors; and
one or more non-transitory computer-readable media storing instructions executable by the one or more processors, wherein the instructions, when executed, cause the system to perform operations comprising:
receiving first data associated with a vehicle in an environment;
determining, based at least in part on the first data, a location associated with a first object that causes an occluded region in the environment relative to the vehicle;
determining an object type of the first object or a likelihood of a second object emerging from the occluded region;
determining ambient sound in the environment;
determining, based at least in part on the location, the ambient sound, and at least one of: the object type of the first object or the likelihood of the second object emerging from the occluded region, audio data including a frequency and a sound level for output by the vehicle; and
outputting, by a speaker of the vehicle, the audio data over a time period to notify the first object or the second object in the occluded region of the vehicle's presence.

17. The system of claim 16, wherein:
the sound level is a first sound level, and
determining the audio data is further based at least in part on one or more of: weather in the environment, a sub-type of the first object or the second object, ambient light in the environment, a level of attention by the first object, a distance between the vehicle and one of the first object or the occluded region, a second sound level of the environment, or presence of a school zone.

18. The system of claim 16, the operations further comprising:
receiving, from a first machine learned model, a predicted intersection between the vehicle and the first object;
inputting, into a second machine learned model, the predicted intersection and the first data representing audio data in the environment; and
receiving, from the second machine learned model, a sound profile comprising the frequency and the sound level for output by the vehicle.

19. The system of claim 16, the operations further comprising:
determining a first location of the first object or a second location associated with the occluded region relative to the vehicle, wherein outputting the audio data comprises targeting the audio data towards the first object or the second object based at least in part on the first location or the second location.

20. The system of claim 16, the operations further comprising:
determining, based at least in part on a change in position by the first object or the second object relative to the vehicle, has increased from a first time to a second time after the first time; and
modifying the sound level of the audio data from the first time to the second time based at least in part on the change in the position by the first object or the second object.

* * * * *